UNITED STATES PATENT OFFICE 2,583,559

TETRAGLYCINE DIHYDROHEPTIODIDE AND METHODS OF MAKING THE SAME

Walter S. Frost, Somerville, Mass., assignor, by mesne assignments, to Morgan-Sabalol Products, Inc., New York, N. Y., a corporation of New York No Drawing. Application September 10, 1949, Serial No. 115,115

10 Claims. (Cl. 260—534)

This invention relates to the preparation of chemical compounds containing hydriodic acid, iodine and amino acids, especially glycine, which have the property of releasing free iodine when they are added to solvents, particularly water.

It is an object of this invention to provide products of this type and processes for their manufacture.

While chemical union of hydriodic acid, iodine and glycine into one or more true chemical entities must occur in the manufacture of a water sterilizing agent which I call Bursoline and on which I have patent pending (U. S. Patent Office application Number 558,972), an elucidation of the chemical composition and properties of such chemical entity or entities does not detract in any way from the value of the Bursoline composition but does make possible the manufacture of any such chemical entity or entities and analogous compounds free from any other, if desired, or improvements in such manufacture, as well as the choice of any one or more of them, free, if desired from excess of any of their constituents, and, if wanted, free of any other substance, to the end that a selection may be made of any or either of them or mixture thereof, in order that their special properties such as stability, solubility, solution rate, preferred iodine content, etc. may be selected for the improvement of water sterilizing or purifying agents, disinfecting or germicidal agents, pharmaceutical preparations and the like or for the manufacture of new and novel ones, such as capsule or tablet internal iodine medications or prepared solid forms for the treatment of cuts, abrasions, insect bites, etc. In general, the especial value of tetraglycine dihydroheptiodide particularly, and such related compounds as are represented by the formula $(CR_2NR_2COOH)_4 \cdot (HI)_2 \cdot I_5$ where R is hydrogen or a monovalent organic radical, is due to the combination of (1) very low vapor pressure of free iodine as compared with iodine itself, thus contributing to their stability when exposed to the air, and (2) to their ability to liberate free elemental iodine when added to solvents, particularly water.

In general, my present process comprises reacting hydriodic acid and iodine with a substance selected from the group glycine and substituted glycine having the type formula $CR_2NR_2COOH$ where R is hydrogen or a monovalent organic radical, in such a manner and in such proportions as to form tetraglycine (or substituted tetraglycine) dihydroheptiodide of the general formula $(CR_2NR_2COOH)_4 \cdot (HI)_2 \cdot I_5$ but particularly the glycine derivative $(CH_2NH_2COOH)_4 \cdot (HI)_2 \cdot I_5$.

Tetraglycine dihydroheptiodide when crystallized from water solution may be obtained either in the form of compact purple-black crystals, particularly by slowly cooling a hot saturated solution, or in the form of a finely divided dark brown precipitate, particularly when it is fairly rapidly precipitated. On drying a mass of either of these forms, but particularly on drying a mass of the latter form, as, for example, on drying a filter cake of it in the air at room temperature, the mass becomes covered with purple crystals of the same substance which resemble purple plush in appearance. When finely ground all are gray-black with a purple cast. The melting point is 156° C. to 161° C. Decomposition occurs at the melting point. The observed melting point is lower with slow than with fast heating. It is stable indefinitely when bottled in an inert container and shows only about five per cent of its iodine lost on exposure of several days to the air at room temperature. On being added to water and to other solvents it releases five equivalents (five gram atomic weights) of free iodine from one gram molecular weight of the compound.

This type of compound can be made from hydriodic acid, iodine and glycine (or substituted glycine) or from diglycine hydriodide $$(CH_2NH_2COOH)_2 \cdot HI$$

(or substituted diglycine hydriodide) and iodine. The manufacture of such compounds can be carried out by the interaction of iodine and diglycine hydriodide (or substituted diglycine hydriodide) in the absence of any solvent. They may also be manufactured in any suitable solvent, for example, water or glacial acetic acid, with crystallization therefrom. Water is a preferred solvent.

Optimum proportions for the manufacture of the pure compounds in the absence of any solvent are those represented by the stoichiometric proportions, namely two molecular weights of diglycine hydriodide (or substituted diglycine hydriodide) and five atomic weights of iodine. The diglycine hydriodide (or substituted diglycine hydriodide) should be finely divided, such as by grinding and passing through an 80 mesh sieve. The iodine will react if added in coarse crystals but will react more rapidly if more finely divided. If ground too fine it becomes troublesome on account of lumping. Passing through a 40 mesh sieve is satisfactory. The rapidity of the reaction is a function of the fineness of subdivision of the ingredients, the finer the more rapid the reaction. Rapid mixing also accelerates the reaction as also does a moderate rise in temperature above room temperature.

As an example of a now preferred process using this method 556 grams of diglycine hydriodide are ground and passed through an 80 mesh sieve and 635 grams of iodine, through a 40 mesh sieve, are added to it in a closed container and thoroughly mixed with it. Compound formation starts at once and the purple color of crystals of tetraglycine dihydroheptiodide can be seen in a day or two. Occasional further mixing is practiced and up to about two weeks are allowed for the reaction. Storage is in closed, preferably inert, containers.

Since iodine is lost by evaporation of their solutions in the open, tetraglycine dihydroheptiodide and related compounds may be made, using solvents, particularly water, by cooling their saturated solutions in closed containers, employing such excess of one or more of their constituents, glycine (or substituted glycine), hydriodic acid or iodine, as is desired, in making such saturated solutions, resulting in the crystallization of the desired compound. It is possible to use diglycine hydriodide instead of the molar equivalent of hydriodic acid and the two moles of glycine which correspond to each mole of hydriodic acid, and substituted diglycine hydriodide instead of the molar equivalent of hydriodic acid and the two moles of substituted glycine which correspond to each mole of it. Such compounds can also be conveniently made, using solvents, by adding the several constituents in stoichiometric ratio, or with such excess of one or more than one of them as desired, to an amount of solvent, particularly water, which becomes supersaturated when the ingredients react, with subsequent crystallization of the compound and removal from the solution after adjusting the temperature to about room temperature or below.

As an example of a now preferred method for making tetraglycine dihydroheptiodide by cooling a saturated solution, 100 grams of diglycine hydriodide (or the equivalent in glycine and hydriodic acid) in 100 milliliters of water are placed in a wide-mouthed ground glass stoppered bottle with 100 grams of iodine which has been passed through a 40 mesh sieve, heated in a water bath to 70° C. and shaken well. After slow cooling and filtering in a suction filter and drying, with simultaneous sublimation of any elemental iodine present, at room temperature or with only gentle warming, compact, purple-black crystals of the compound are obtained, melting point, 156° C. to 161° C.

In a now preferred method for the manufacture of tetraglycine dihydroheptiodide using a solvent and at about or below room temperature, 139 grams of diglycine hydriodide (or the equivalent in glycine and hydriodic acid) are dissolved in 300 milliliters of water at about or below room temperature and 159 grams of iodine which has been passed through a 40 mesh sieve are added and the solution stirred vigorously. The finely divided dark brown form of the compound usually begins to precipitate within two or three minutes. As soon as the solid iodine particles have disappeared (usually within about fifteen minutes, depending upon the efficiency of the stirring) the temperature is adjusted to about room temperature and the finely divided dark brown precipitate filtered in a suction filter and allowed to dry in the air. During the drying it becomes covered with crystals of the purple plush form of the compound. These often attain several milliliters in length. The filter cake is broken open and any elemental iodine present is allowed to sublime using only gentle warming, if any. The product is mixed, ground and further exposed under the same conditions to remove any remaining moisture or elemental iodine. The melting point is 156° C. to 161° C.

I claim:

1. The process for the preparation of a compound containing hydriodic acid, iodine and glycine comprising intimately mixing diglycine hydriodide and iodine in the proportion of two molecular weights of diglycine hydriodide and five atomic weights of iodine, permitting reaction of said substances with the formation of a reaction product containing per gram molecular weight, two gram molecular weights of hydriodic acid, five gram atomic weights of iodine and four gram molecular weights of glycine.

2. The process for the preparation of a compound containing hydriodic acid, iodine and glycine comprising intimately admixing two molecular weights of diglycine hydriodide and five atomic weights of iodine, permitting reaction of said substances in the absence of solvents with the formation of tetraglycine dihydroheptiodide.

3. In a process for the preparation of a compound containing diglycine hydriodide and iodine the steps which comprise intimately admixing the ingredients in the form of diglycine hydriodide which has been passed through an 80 mesh sieve and iodine which has been passed through a 40 mesh sieve, permitting reaction of said substances in the absence of solvents with the formation of a reaction product containing per gram molecular weight, two gram molecular weights of diglycine hydriodide and five gram atomic weights of iodine.

4. In a process for the preparation of a compound containing hydriodic acid, iodine and glycine the steps which comprise intimately admixing in stoichiometric ratio the ingredients in the form of diglycine hydriodide and iodine, permitting reaction of said substances in the absence of solvents with the formation of a reaction product containing per gram molecular weight, two gram molecular weights of hydriodic acid, five gram atomic weights of iodine and four gram molecular weights of glycine.

5. The process for preparing tetraglycine dihydroheptiodide which comprises cooling a saturated solution of the compound made by interaction of about two to four molecular weights of glycine, two molecular weights of hydriodic acid and about two to about five atomic weights of iodine with subsequent crystallization of the tetraglycine dihydroheptiodide.

6. The method of making tetraglycine dihydroheptiode which comprises adding enough hydriodic acid which may be in the form of diglycine hydriodide, together with glycine, if needed, and iodine, to give the ratio of about two to four molecular weights of glycine, two molecular weights of hydriodic acid and about two to five atomic weights of iodine to such an amount of a member of the group consisting of water and other solvent that the solution at about room temperature or below becomes supersaturated with respect to tetraglycine dihydroheptiodide and the substance crystallizes out.

7. A method for manufacturing tetraglycine dihydroheptiodide consisting of adding about two to four molecular weights of glycine, two molecular weights of hydriodic acid and about two to about five atomic weights of iodine to an amount of water at about room temperature or below which becomes supersaturated with tetraglycine dihydroheptiodide and the latter precipitates.

8. A method for preparing tetraglycine dihydroheptiodide comprising adding two molecular weights of diglycine hydriodide and about two to about five atomic weights of iodine to an amount of water at about room temperature or below which becomes supersaturated with tetraglycine dihydroheptiodide and the latter precipitates.

9. As a new product $$(CH_2NH_2COOH)_4 \cdot (HI)_2 \cdot I_5$$

10. As a new product, tetraglycine dihydroheptiodide, being a compound which exists as compact, purple-black crystals, as a dark brown precipitate in water and as purple crystals similar to plush in appearance, gray-black with a purple cast when finely divided, melting point of 156° C. to 161° C., a very low vapor pressure of free iodine as compared with iodine itself and which liberates free iodine in the ratio of five gram atomic weights of iodine to each gram molecular wieght of the compound when the compound is added to water.

WALTER S. FROST.

REFERENCES CITED

The following references are of record in the file of this patent:

UNITED STATES PATENTS

| Number | Name | Date |
| --- | --- | --- |
| 2,498,174 | Morris | Feb. 21, 1950 |

OTHER REFERENCES

Pfeiffer, Beilstein (Handbuch, 4th ed.) 2d suppl., pages 779, 784 (1942).